United States Patent [19]

Kuhlmann et al.

[11] Patent Number: 4,930,588
[45] Date of Patent: Jun. 5, 1990

[54] ELECTRONIC BALANCE

[75] Inventors: Otto Kuhlmann; Walter Södler; Eberhard Stadler, all of Göttingen, Fed. Rep. of Germany

[73] Assignee: Sartorius GmbH, Göttingen, Fed. Rep. of Germany

[21] Appl. No.: 398,958

[22] Filed: Aug. 28, 1989

[30] Foreign Application Priority Data

Sep. 1, 1988 [DE] Fed. Rep. of Germany ....... 3829637

[51] Int. Cl.⁵ .................. G01G 7/00; G01G 23/14
[52] U.S. Cl. .................................. 177/212; 177/168
[58] Field of Search ................. 177/212, 168, DIG. 9

[56] References Cited

U.S. PATENT DOCUMENTS

| | | | |
|---|---|---|---|
| 3,955,638 | 5/1976 | Wasko | 177/212 |
| 4,113,040 | 9/1978 | Storace | 177/DIG. 9 |
| 4,461,364 | 7/1984 | Strickler | 177/DIG. 9 |
| 4,722,409 | 2/1988 | Kunz | 177/212 |

FOREIGN PATENT DOCUMENTS 1238229 7/1968 Fed. Rep. of Germany .
3639521 6/1988 Fed. Rep. of Germany .

Primary Examiner—George H. Miller, Jr.
Attorney, Agent, or Firm—Eric P. Schellin

[57] ABSTRACT

An electronic balance with a weighing scale which is connected via a parallel guide to a system carrier, and with a translation lever which is rotatably mounted on the system carrier and onto the shorter lever arm of which the force of the weight acting on the balance scale is transferred via a coupling element and on the longer arm of which the coil of an electromagnetic compensation of force is fastened, that at least one spring touches the translation lever for the purpose of astatization, the line of application of which spring passes through the point of rotation of the translation lever. This results in a compact design and a good efficiency of astatization. It is advantageous to use a wire or a band and/or a laterally jutting-out projection on the translation lever as spring.

6 Claims, 3 Drawing Sheets

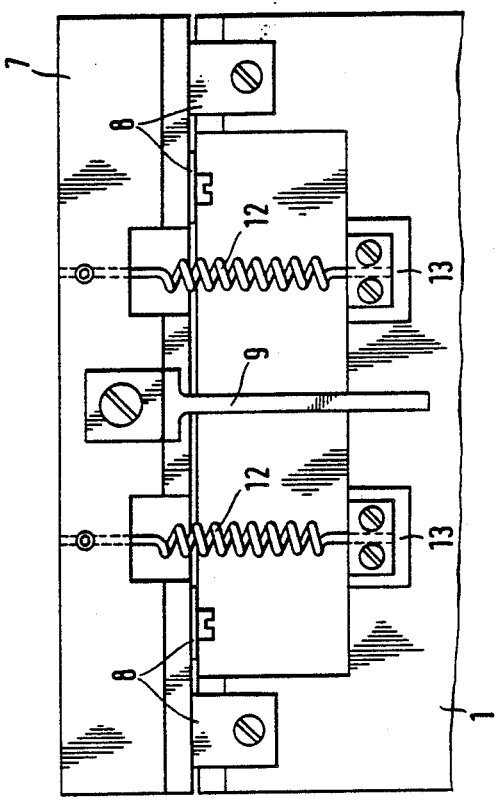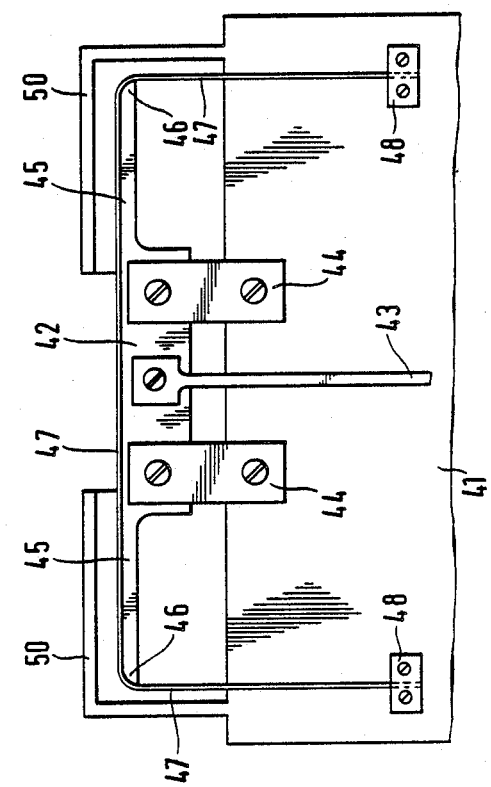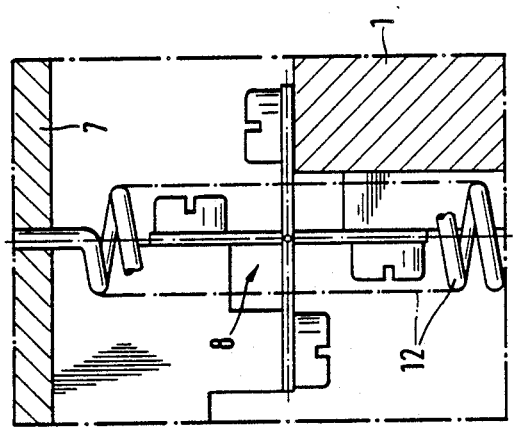

ELECTRONIC BALANCE

BACKGROUND OF THE INVENTION

The invention relates to an electronic balance. Electronic balances of this type are generally known, e.g. from W. German patent document DE-OS No. 36 39 521.

Furthermore, W. German patent document DE-PS No. 1 238 229 teaches that a spring with a horizontal line of application can be allowed to touch the balance scale carrier for the purpose of astatizing in a mechanical balance with parallel guide and lever. The transfer of this arrangement to an electronic balance is disadvantageous in as far as the horizontal astatizing spring must be distinctly longer than the guide rods of the parallel guide in order to yield good efficiency. However, this would distinctly increase the size of the balance.

The invention therefore has the problem of creating a space-saving and especially effective possibility of astatizing for an electronic balance of the initially mentioned type characterizing part of claim 1.

If the astatizing spring touches the parallel-guided balance scale carrier according to the state of the art, then the contact point of the spring describes a circle with the radius of the guide-rod length, usually approximately 50 to 100 mm. However, if the astatizing spring touches the translation lever in accordance with the invention, then the contact point of the spring can be moved e.g. up to 5 mm from the point of rotation of the lever, which considerably increases the effectiveness of the astatizing spring and also shortens the necessary length of the spring to the same extent. In addition, the direction of application of the astatizing spring can be in any direction, depending on the space requirements. As a result, a design can be selected in which the astatizing spring runs horizontally, as in the cited DE-PS No. 1 238 229, or a design in which the astatizing spring runs vertically. The latter embodiment has the advantage that it can also be used if the mounting of the translation lever on the system carrier consists only of one or several vertical leaf springs.

SUMMARY OF THE INVENTION

The astatizing spring consists in an advantageous embodiment of a wire or a band. This requires only a small amount of space for the spring. The recognition is made use of thereby that the great, possible spring path of a customary helical spring is not at all necessary for an astatizing spring and thus that a spring design can also be used which achieves its full tractive force even at a slight change of length.

In another advantageous embodiment, the astatizing spring consists of an elastic projection jutting out laterally from the translation lever. This elastic projection which juts out laterally is connected via a wire or a band to the system carrier. This also results in a very compact design.

These two embodiments can of course also be combined with one another in as far as both the laterally jutting-out projection and also the wire or band are dimensioned in such a manner that they contribute to the resilience and thus act as part of the astatizing spring.

In order to avoid temperature gradients between the astatizing spring and the system carrier, the astatizing spring is advantageously housed at least partially in a hollow space whose walls are connected to the system carrier.

BRIEF DESCRIPTION OF THE DRAWINGS

FIG. 1a is enlarged detail of FIG. 1, along cross-section Ia.

FIG. 2 shows a side view of the system carrier and the mounting of the translation lever of FIG. 1.

FIG. 5 shows a third embodiment of the weighing system of the electronic balance in a side view of the system carrier and the mounting of the translation lever.

DETAILED DESCRIPTION OF THE INVENTION

Figure 1:
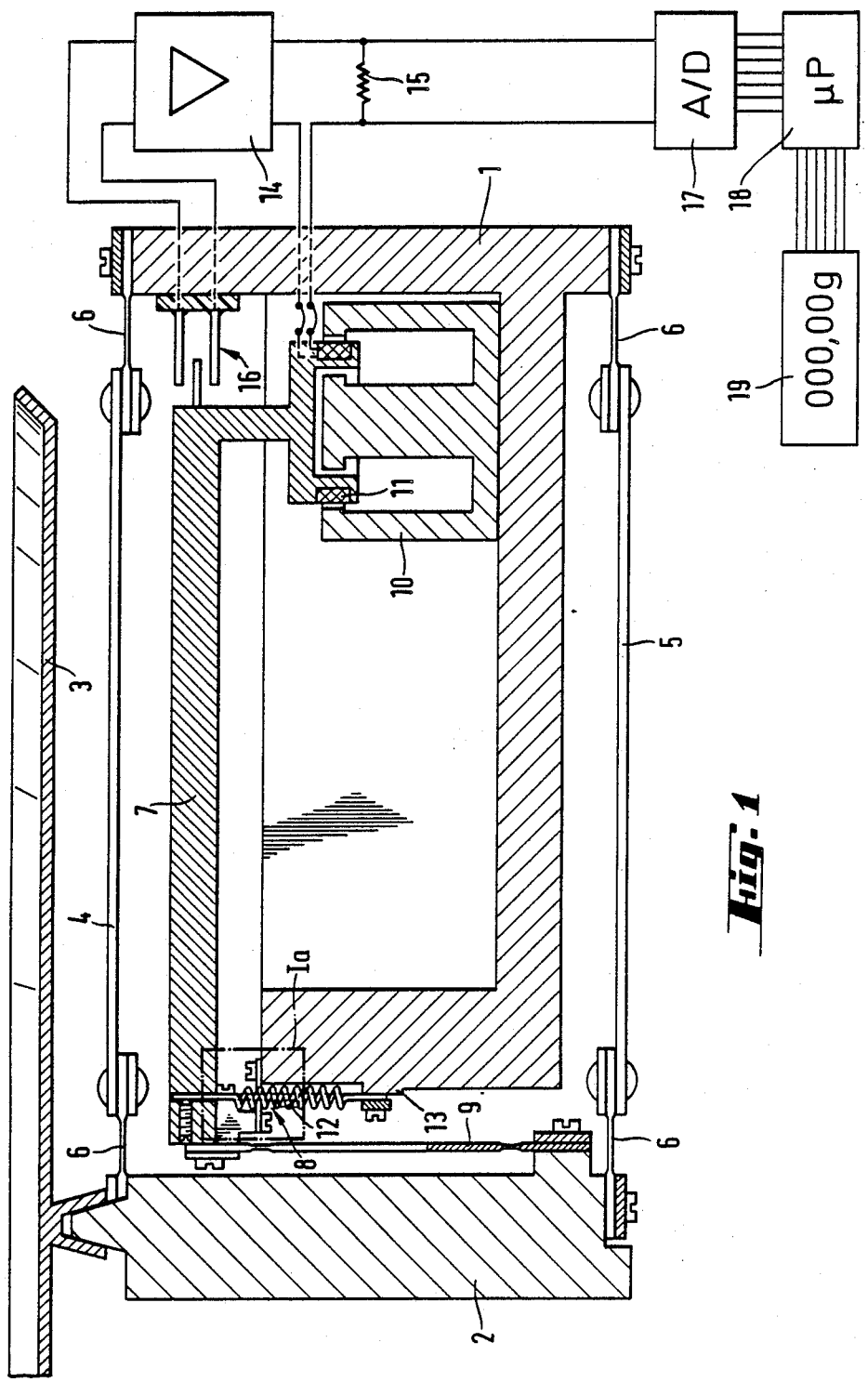
FIG. 1 shows the weighing system of the electronic balance in section and the associated electronic circuitry as a block wiring diagram.

FIG. 1 shows the weighing system of the electronic balance in section and the associated electronic circuitry as a block wiring diagram. The housing of the electronic balance has been omitted for the sake of clarity. The weighing system consists of a system carrier 1 to which a load receiver 2 is fastened in a vertically movable fashion via two guide rods 4, 5 with articulations 6. Load receiver 2 transfers the force corresponding to the mass of the material to be weighed on balance scale 3 via coupling element 9 to the load arm of translation lever 7. Translation lever 7 is mounted by means of cross spring joint 8 (See FIG. 1a) to system carrier 1. A coil shell with coil 11 is fastened to the compensation arm of translation lever 7. Coil 11 is located in the air gap of permanent magnet system 10 and generates the compensation force. The magnitude of the compensation current through coil 11 is regulated thereby in a known manner by position sensor 16 and automatic gain control amplifier 14 in such a manner that equilibrium prevails between the weight of the material to be weighed and the electromagnetically generated compensation force. The compensation current generates a measuring voltage on measuring resistor 15 which is fed to analog-to-digital converter 17. The digitized result is assumed by digital signal processing unit 18 and digitally displayed in display 19. These parts of the weighing system of the electronic balance are generally known and are therefore described only quite briefly above.

Furthermore, the weighing system in FIG. 1 comprises two springs 12 for astatization, only one of which can be recognized in FIG. 1. Springs 12 are fastened on the one end to translation lever 7 above the point of rotation of cross spring joint 8 and on the other end to projection 13 of system carrier 1 below the point of rotation of cross spring joint 8. The line of application of springs 12 runs in the reference position of translation lever 7 exactly through the point of rotation of cross spring joint 8, so that springs 12 can not exercise any torque on translation lever 7 in this position and therefore do not influence the result of weighing. The tractive force of springs 12 results in a torque on translation lever 7 only when translation lever 7 is deflected out of its reference position, whereby the direction of the action of this torque is such that it attempts to increase the deflection out of the reference position. Thus, the torque of springs acts exactly counter to the torque from the springs of cross spring joint 8, which attempts to rotate translation lever 7 back to the reference position. Given the correct dimensioning of the force of springs 12, the two torques exactly cancel one another out and translation lever 7 can be moved without torque and is thus astatized. This is of course true only for a limited angular range. In the same manner, not only the returning torque of cross spring joint 8 but also the additional, returning torque of the parallel guide from guide rods 4, 5 can be entirely or partially cancelled by springs 12.

FIG. 2 shows the arrangement of the two springs 12 again in a side view of the front surface of translation lever 7. Translation lever 7 is visible, which is connected via a cross spring joint consisting of a total of 4 springs 8 (two vertical and two horizontal) to system carrier 1. Coupling element 9 is indicated only by its upper section. The two springs for astatization are fastened in such a manner to translation lever 7 that their force contact point is located above the point of rotation given by cross spring joint 8 and are also fastened to projection 13 on system carrier 1.

Figure 3:
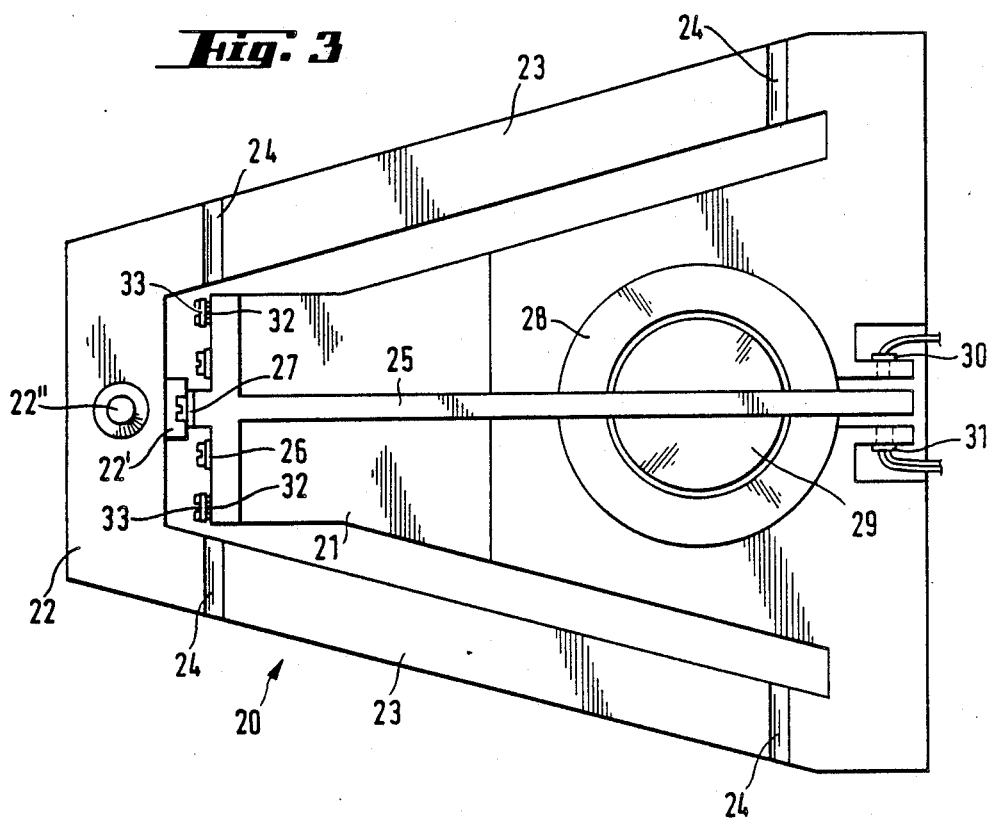
FIG. 3 shows a second embodiment of the weighing system of the electronic balance in a top view.

FIG. 3 shows a top view of a second embodiment of the weighing system of the electronic balance. The parallel guide consists of a single block 20 which encompasses both system carrier 21, load receiver 22 and also guide rods 23 with thin areas 24. Magnet 28, optical position sensor 30/31 and, via two springs 26, translation lever 25 are fastened to system carrier 21. The transfer of force from load receiver 22 with fastening cone 22" for the balance scale (not shown) takes place via coupling element 27 which is fastened on the one hand to a lower projection 22' of load receiver 22 and on the other hand to translation lever 25. Translation lever 25 again carriers a coil 29 on its longer lever arm for the electromagnetic compensation of force. This weighing system is, so far, known from W. German patent document DE-OS No. 34 22 042, so that a more detailed description need not be given here.

Figure 4:
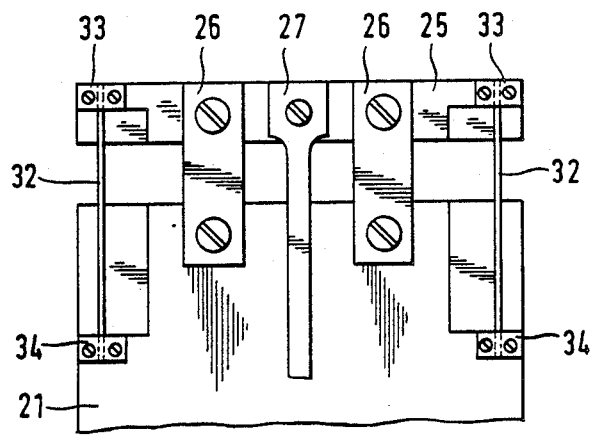
FIG. 4 shows a side view of the system carrier and of the mounting of the translation lever of FIG. 3.

This weighing system additionally comprises two springs, each in the form of a wire 32, for astatization, as can best be recognized from the associated side view in FIG. 4. The two wires 32 are so thin that they act as springs. They are fastened by clamping plates 33 to translation lever 25 and by clamping plates 34 to system carrier 21. The method of operation corresponds to the method of operation of springs 12 already explained above.

FIG. 5 shows a third embodiment of the weighing system of the electromagnetic balance, whereby only the parts which are essential for the invention are shown in a side view. Translation lever 42 is again connected via vertical springs 44 to system carrier 41. Coupling element 43 is shown only in its upper section. Translation lever 42 comprises two lateral projections 45 for astatization, over the ends 46 of which bracing wire 47 runs. The ends of bracing wire 47 are fastened by two clamping plates 48 to system carrier 41. Both the lateral projections 45 and bracing wire are resilient and therefore act as part of the astatizing spring. Depending on the dimensioning of lateral projections 45 and on the diameter of bracing 47, both suspension parts can be approximately equally large or one part or the other can predominate.

FIG. 5 indicates a further detail: Lateral projections 45 on translation lever 42 and bracing wire 47 are surrounded by metal walls 50 which extend up from system carrier 41. In this manner, parts 45 and 47 of the astatizing spring can be thermally coupled to the system carrier by means of front closure caps (not shown) so that, to the extent possible, no temperature differences can occur. A static temperature coefficient of the force of the astatizing spring can also be brought close to zero or close to the temperature coefficient of the spring constant of the cross spring joint and of the parallel guide of the guide rods by properly selecting the materials of the individual components. In this manner, the influence of temperature changes and the influence of temperature gradients can be largely excluded.

Instead of the wire, a band can naturally also be used in the preceding embodiments. Likewise, a band or a wire as spring can be used in the embodiment according to FIGS. 1, 2 instead of the helical spring shown. Instead of the two springs, only one centrally located spring can be used. Instead of the simple fastening of the spring(s) shown by means of setscrews, more complicated fastening constructions which permit an adjustment of the tractive force and of the lateral position can also be used. In the embodiments shown, standing leaf springs are always shown as pivot bearing for the translation lever and these leaf springs are loaded with pressure/lateral flexure by the astatizing springs. In like manner, suspended leaf springs can of course also be used as pivot bearing for the translation lever which are loaded with traction by the astatizing springs. All these variants can be easily designed by an expert, so that a detailed description is not needed here.

Moreover, the design of the invention can also be logically transferred to electronic weighing systems with several levers coupled in series.

We claim:

1. An electronic balance with a balance scale which is connected via a parallel guide to a system carrier, and with a translation lever which is rotatably mounted on the system carrier and onto the shorter lever arm of which the force of the weight acting on the balance scale is transferred via a coupling element and on the longer arm of which the coil of an electromagnetic compensation of force is fastened, characterized in that at last one spring touches the translation lever for the purpose of astatization, the line of application of which spring passes through the point of rotation of the translation lever.

2. The electronic balance according to claim 1, wherein the line of application of the spring runs vertically.

3. The electronic balance according to claim 2, wherein a wire is used as a spring.

4. The electronic balance according to 2, wherein a band is used as a spring.

5. The electronic balance according to 2, wherein a laterally jutting-out, resilient projection on the translation lever is used as spring and that this projection is connected to the system carrier via a wire or a band.

6. The electronic balance according to claim 5, wherein the spring runs at least partially in a hollow area whose walls are connected to the system carrier.

* * * * *